Aug. 1, 1939.　　　K. R. MÜLLER　　　2,167,812
ESCAPEMENT DEVICE FOR TYPEWRITING MACHINES
Filed July 24, 1936　　　5 Sheets-Sheet 1

INVENTOR:
Karl Reinhold Müller, Dec'd, By
Hermann Güttler, Administrator.

INVENTOR:
Karl Reinhold Müller, Dec'd., By
Hermann Güttler, Administrator.

INVENTOR:
Karl Reinhold Müller, Dec'd., by
Hermann Güttler, Administrator.

Aug. 1, 1939.  K. R. MÜLLER  2,167,812
ESCAPEMENT DEVICE FOR TYPEWRITING MACHINES
Filed July 24, 1936   5 Sheets-Sheet 5

INVENTOR:
Karl Reinhold Müller, Dec'd, By
Hermann Güttler, Administrator.

Patented Aug. 1, 1939

2,167,812

UNITED STATES PATENT OFFICE 2,167,812

ESCAPEMENT DEVICE FOR TYPEWRITING MACHINES

Karl Reinhold Müller, deceased, late of Neugersdorf, Germany, by Hermann Güttler, administrator, Dresden, Germany, assignor to Firma A. G. vorm. Seidel & Naumann, Dresden, Germany, a corporation of Germany Application July 24, 1936, Serial No. 92,379
In Germany July 20, 1934

10 Claims. (Cl. 197—84)

This invention relates to type-writing machines, calculating type-writing machines or the like in which an escapement wheel cooperates with fixed and loose pawls in the well known manner in order to space the steps of the case after every printing of a letter.

In such a machine for the purpose of stopping the spacing movement of the loose pawl movable abutments guided for axial shifting movement in the carrier body of the said fixed and loose pawls are provided and arranged in positions which allow the loose pawl when released from the escapement wheel spacing movements of different length depending on which of the abutments has been moved into its operative position. This allows of spacing the different types differently according to their own width and of gaining a superior impression of a printed text.

It is of course necessary that the loose pawl in moving for example towards the abutment for the longest spacing movement of the loose pawl should never lose its engagement with the escapement wheel. Now, in order to make the spacing lengths independent of, the loose pawl is given the form of a wheel in engagement with the escapement wheel, that is, a plurality of loose pawl teeth are provided which act as a unit like the teeth of a wheel allowing the first of them, the loose pawl proper, to get entirely out of engagement with the escapement wheel.

Further details of this invention are explained by the following description with reference to the appended drawings showing by way of example several embodiments of the invention, and in which;

Fig. 1 is a rear elevation while

Figure 1:
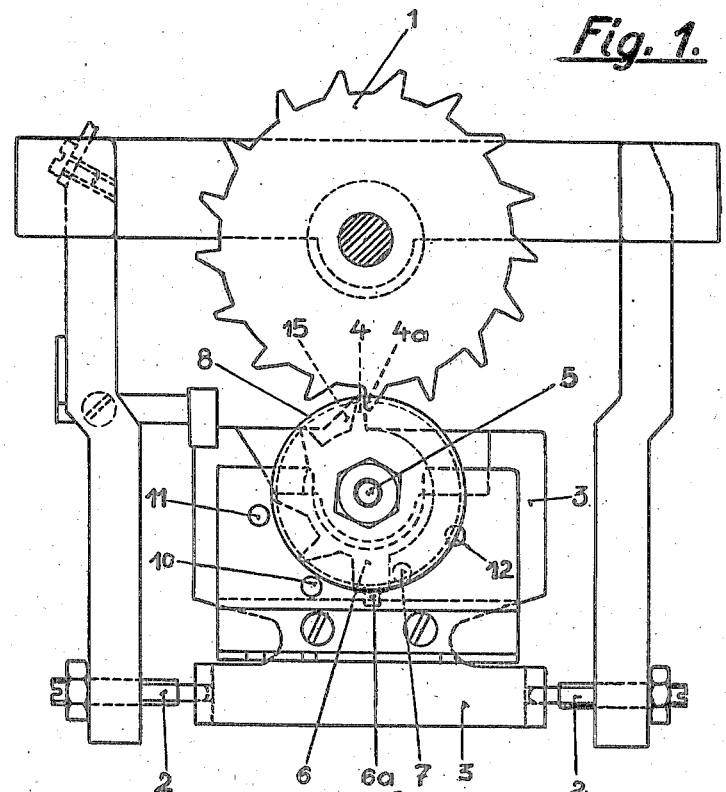
Figure 3:
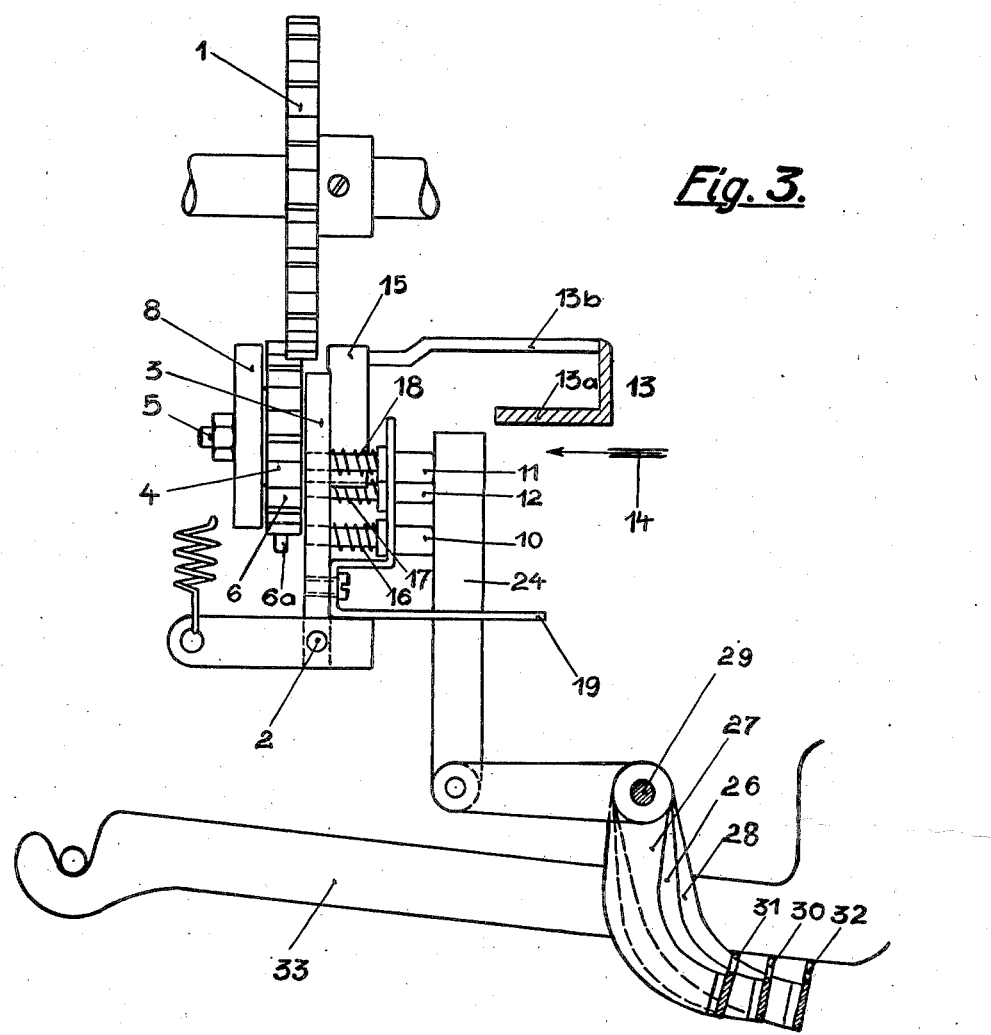
Fig. 3 is a vertical section through a portion of a typewriter showing only those parts which are operatively associated with the escapement mechanism and Fig. 4 shows parts of Fig. 3 in a temporary position during the feeding movement of the carriage.

The escapement wheel 1 driven by the feeding spring is held fast in the well known manner by a loose pawl 4 journalled in a rocking member 3 which is pivoted in the axle 2. The said loose pawl, during a stand-still position of the carriage, abuts with an arm 6, in anticlockwise direction as seen in Fig. 1; against an abutment 7 fixed in member 3. A spiral spring 9 enclosed in a casing 8 around axle 5 tends to turn the pawl 4 with an elongation 6a of the arm 6 clockwise (Fig. 1) towards abutments 10, 11 which are movable in and out of their operative position or with the edge 4a of the pawl 4 towards an abutment 12 which is likewise movable. Only one of the abutments 10, 11, 12 is in operative position at one time. As is well known in the art however the said pawl 4 can yield to the pull of the spring 9 only during the stepwise feeding of the carriage produced by the so-called universal cross-piece 13 (Fig. 3) which with its part 13b causes the rocking member 3 to rock in the direction of arrow 14 (Fig. 3) around the axle 2. This movement brings the rigid pawl 15 disposed in a staggered position relative to the loose pawl, into the path of the teeth of wheel 1 allowing the latter a small clockwise turn whilst the loose pawl 4 is momentarily moved out of the path of the said teeth. It is now that the loose pawl 4 according to this invention is enabled to yield to the pull of the spring 9 different distances depending on which of the abutments has been put into its operative position to act as abutment for this yielding movement.

Figure 2:
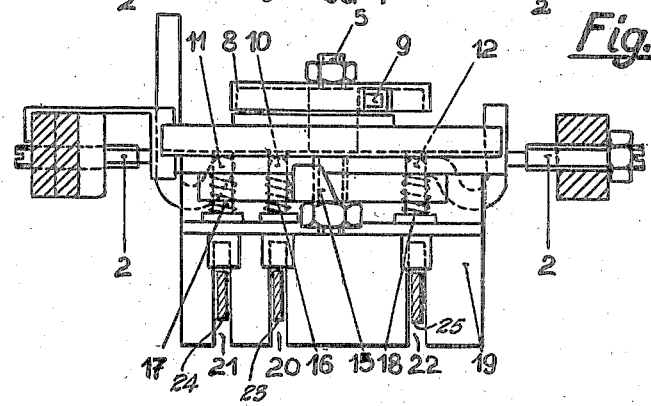
Fig. 2 is a top plan view of the escapement mechanism according to this invention.

Suppose a set of types contains types of three different widths and abutment 10 is coordinated to the smallest width, abutment 11 to the medium width and abutment 12 to the greatest width. These abutments being guided in bores of the plate-like rocking member 3 (Fig. 3) are as a rule prevented by springs 16, 17, 18 from protruding from the said rocking member towards its rear so as to allow the loose pawl 4 to glide smoothly over these borings, but they can be individually moved to do so by rods 23, 24, 25 which are operated by the universal cross-piece 13 in the manner hereinafter described, so that they will be pushed out from their bores, the said cross-piece acting upon their front ends against the force of the springs 16, 17, 18. A bent plate 19 shown in Fig. 3 serves as a second guide for the abutments 10, 11, 12 which plate also guides by slots 20, 21, 22 (Fig. 2) the rods 23, 24, 25. Each of the key levers 33 of the typewriter besides operating the universal cross-piece in the well known manner operates one of three cross-pieces 30, 31, 32 according to the width of the type coordinated to the particular key. Each of said cross-pieces 30, 31, 32 by two-arm levers 26, 27, 28 mounted upon axle 29 is linked to that one of the rods 23, 24, 25 which operates the proper abutment to allow the loose pawl an escape movement which again is in accordance with the width of the type in question. Each of the cross-pieces 30, 31, 32 for the purpose set forth is so shaped as to be touched only by the key levers of one group of types of the same width whilst recesses in the same allow the two other groups of key levers to move without operating the said cross-piece. Of course one could as well shape the key levers accordingly instead of the cross-pieces.

Figure 4:
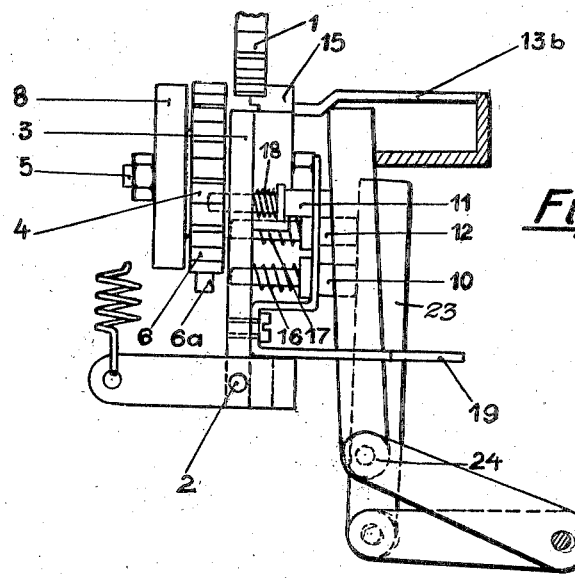
Figure 5:
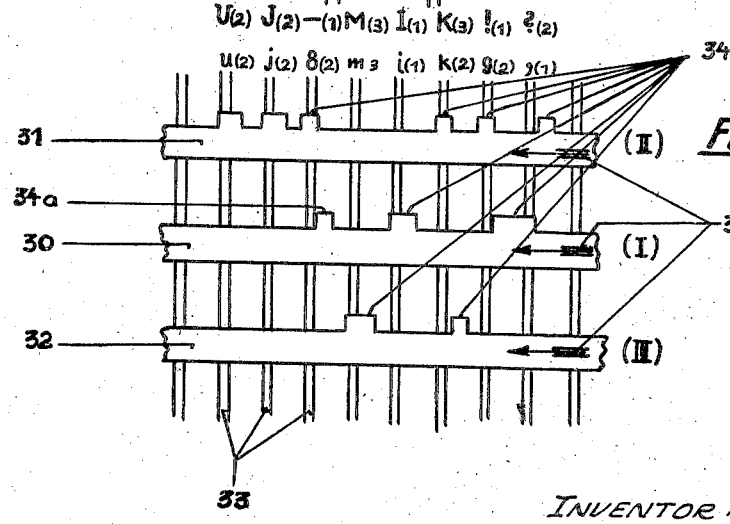
Fig. 5 shows schematically the cross-pieces which influence the abutments for the loose escapement pawl.

Fig. 5 shows schematically the three cross-pieces one above the other, the vertical double lines indicating the relative position of key levers 33 the types of which are marked over each double line respectively with numerals added in brackets indicating the group of width to which the individual type belongs. If it is assumed that type "u" is struck, then evidently cross-piece 31 is actuated while the two other cross-pieces remain at rest. Each cross-piece when actuated in this way moves the corresponding rod 23, 24, or 25 upwards, see Fig. 4, where the said rod engages the universal cross-piece 13 and by a part 13a of the latter is forced to take part in its movement towards the rocking member 3 thereby pushing the abutment with which it is co-ordinated into its operative position. Cross-piece 31 for example commands rod 24 coordinated to abutment 11, see Fig. 4. The universal cross-piece 13 meanwhile causes with its part 13b the rocking member 3 to rock, releasing the loose pawl 4 to turn and abut against the abutment just having been pushed forth. The abutments 10, 11 and 12 are so positioned, that they allow the loose pawl escapement movements of exactly those sizes corresponding to the three different widths of the type groups.

In case the different types on one type body are of different width, the three cross-pieces may be arranged to be shifted together sideways in the direction of arrow 35 (Fig. 5) as soon as for example the case-shifting mechanism is operated. According to Fig. 5 the numeral "8" is for example arranged on the same type body as the underscoring line "—". The width of the latter is one unit and that of the former two units. Striking key "8" would set cross-piece 31 working, which must not be the case when the underscoring line "—" is to be struck. For the latter case the arrangement—which will be described later on in detail—is proposed in which with the case-shifting movement there is combined a lateral movement of the three cross-pieces 30, 31, 32 so that the key lever faces then a recess in cross-piece 31 but engages cross-piece 30 at 34a which controls the abutment 10 for the group of types of one unit width. The cross-piece 32 must of course be recessed for that key-lever also in the shifted position as all the three cross-pieces must be shaped likewise so that the key-levers will engage in both positions only the proper cross-piece. In case both types of one and the same type body are of the same width, the non-recessed part of the cross-piece to be engaged by the key-lever in question must of course be of double breadth and so must be the recessed parts for the same key-lever on the other two cross-pieces. For typewriters with double carriage-shifting movement there could be arranged a double shifting movement of the cross-pieces.

Figure 6:
Fig. 6 is a detail view of two type bodies.

Fig. 6 shows two type blocks with types to be used for the kind of typewriters here described. The types of a smaller width than the greatest one are as shown positioned upon the type body asymmetrically, but all the types at their right hand edges have the same distance from the right hand edge of the type body.

It is possible to arrange the rigid abutment 7 so that the movement of tooth 4 from its position according to Fig. 1 into the position in which it abuts against the said fixed abutment 7 corresponds exactly to the escapement movement necessary for the group of greatest width. When this possibility is used there is no need of a movable abutment 12 nor of providing a cross-piece for the key-levers of the said group. Consequently, three groups in this case would need only two cross-pieces and four groups only three cross-pieces.

Figure 7:
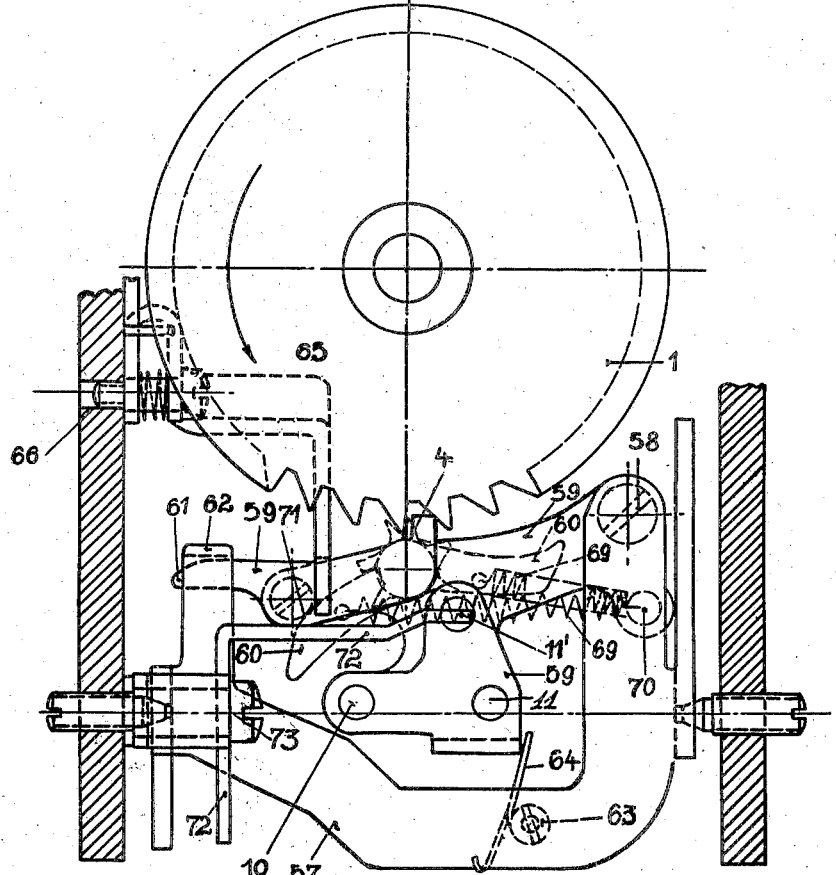
Figs. 7 and 8 are respectively sectional front and sectional views of another embodiment of this invention.
Figure 8:
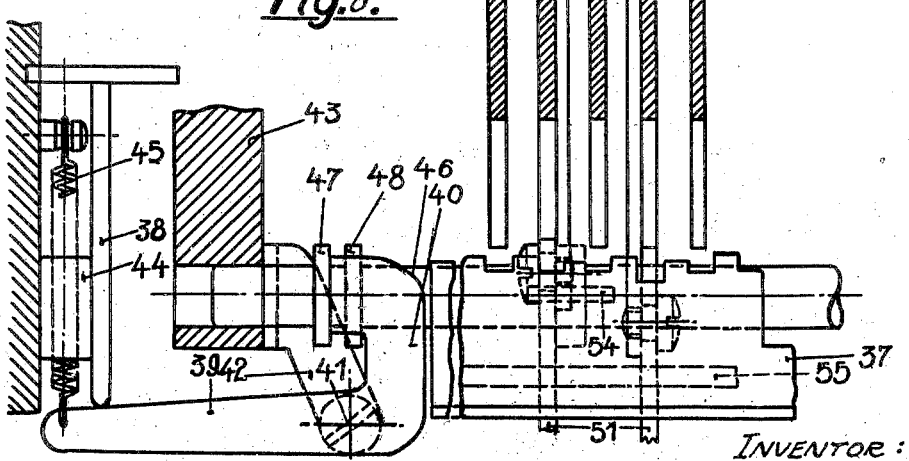
Figure 9:
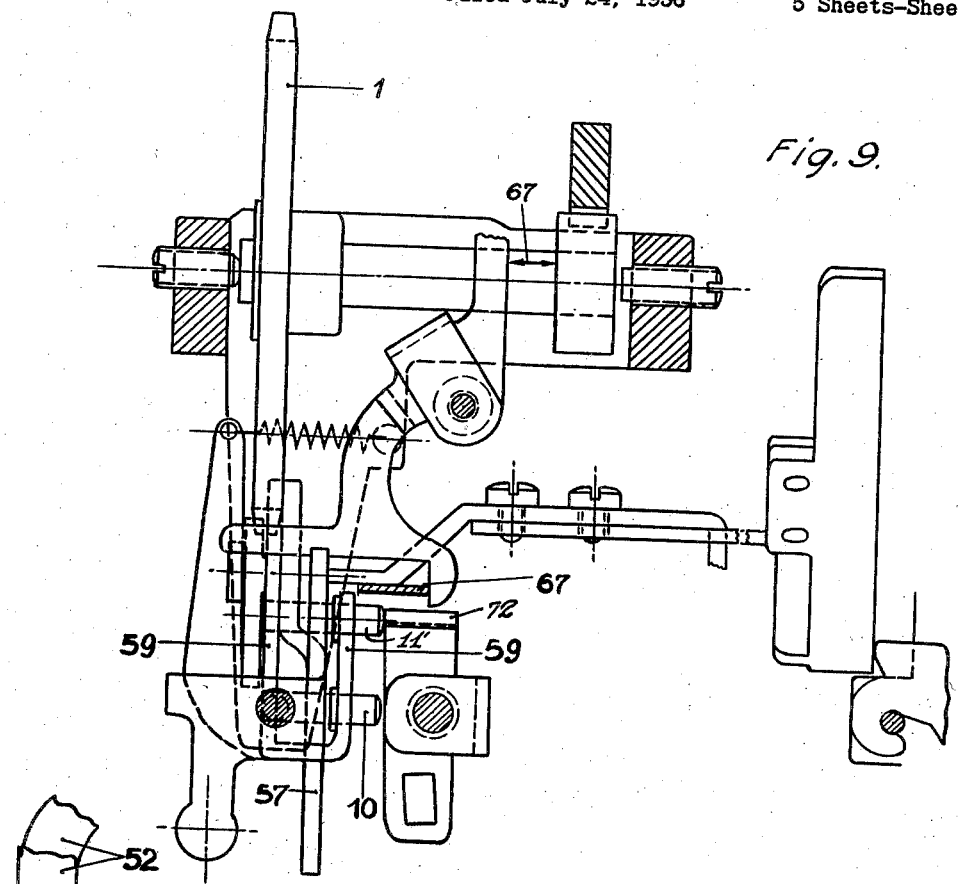
Fig. 9 is a side elevation and Fig. 10 a cross-section of the structure shown in Fig. 7.
Figure 10:
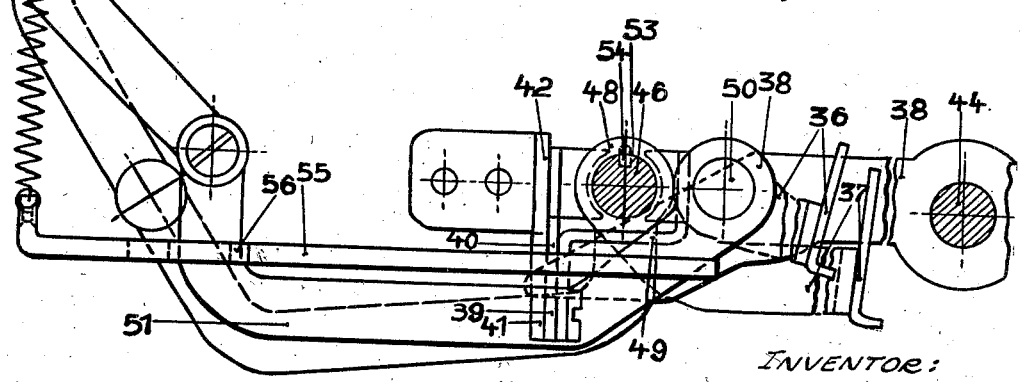

A device of this kind is shown in Figs. 7 and 8 in which there is also shown another form of the rocking member 3 consisting of a bracket 57 to which is linked at 58 a frame 59 for carrying the loose pawl 60 and for guiding the abutments 10, 11 and 11'. The said frame 59 is guided with its free end 61 by bracket 57, which at this end is for this purpose shaped like a hook 62. A spring 64 fixed in the bracket at 63 tends to turn frame 59 upwards against hook 62 in which position the teeth of the loose pawl 60 are in the path of those of the escapement wheel 1. In order to avoid the noise of the teeth of the loose pawl meeting those of the escapement wheel in winding up the said frame 59, against the tension of spring 64, can be pressed down until the loose pawl is free of the escapement wheel by a lever 65 journalled in the frame 66 and actuated by a cross-piece 67 against the action of a spring 68. The said cross-piece 67 may be actuated in any well known manner by a key or lever provided for disengaging the loose pawl from the escapement wheel.

The loose pawl instead of being made as a wheel has the shape of a lever 60 with the tooth 4 on the other side of its fulcrum. A fixed abutment 71 here takes the place of abutment 7 in Fig. 1. The movable abutments 10 and 11 are again coordinated to the two smaller groups of types. There is however a special movable abutment 11' coordinated to the same group of types as the abutment 11 but actuated by the spacing key over the two-arm lever 72 journalled at 73 in frame 66. Instead of by a movable abutment, the third position of the lever 60 for the group of greatest width is effected by the pull of the spring 69 towards screw 70 by which spring 69 is secured to frame 59. This position is shown in dotted lines.

It is preferable for a good impression of the print to coordinate the spacing key to the group of types of medium width as has been done in the example just described.

This invention can also be adapted to constructions in which the loose pawl is shifted instead of rocked.

This device can be used in normal machines for the purpose of writing with greater distances between the types of a word as it is done now by actuating the spacing key after every printing key.

In order to shift the cross-pieces 36, 37 by which the rods 52 for operating the abutments 10 and 11 are actuated laterally when using the carriage shift key 38 a two-arm lever 39, 40, Figs. 7 and 8, is used, which is pivoted at 41 in an arm 42 secured to the frame 43 and rocks in a plane rectangular to that of the shift key-lever 28. The said shift-key lever 38 has its fulcrum at 44 in the frame 43 and when operated acts against arm 39 of the said two-arm lever 39, 40 against the action of a spring 45 which tends to draw lever 39 upwards. The other arm 40 of the two-arm lever leads upwards to the height of shaft 46 there being bent horizontally to face two collars 47, 48 of the said shaft whilst a twin arm 49 of the same shape and screwed to arm 40 is cranked so as to face the said collars on the opposite side of shaft 46. The ends of both twin arms are bent towards one another to enter between the two collars and upon rocking movements of the two-arm lever to shift the shaft 46 laterally. As cross-piece 37 is with two arms keyed to shaft 46 it is also shifted laterally. Cross-piece 36 keyed to shaft 50 is shifted by a like mechanism on the other side of the machine frame and controlled by the right hand carriage shifting key. The arms 51 which lift the rods 52 are keyed upon the shafts 46, 50 by slot 53 and key 54 so as to be able to keep in place when the shafts are shifted laterally whilst being coupled to the turning movements of the said shafts. A plate 55 guides the arms 51 laterally by slots 56.

This invention is independent of the form of the movable abutments for the loose pawl and also of the way they work or are operated. The embodiments described above are only examples and shall in no way restrict the scope of this invention as there are many other ways possible to carry this invention into practice.

What is claimed is:

1. In a typewriting machine, in combination with the movable carriage, of a single escapement wheel for controlling the feed of said carriage, a fixed and a loose pawl in operative relationship to said escapement wheel, a rocking member carrying said pawls, a rigid abutment for stopping the feed of said carriage, movable abutments for different spacing movements of said carriage, means for selectively moving said abutments into operative position, said loose pawl being rotatably mounted in said rocking member and having the shape of a toothed sector adapted to engage said escapement wheel by the sequence of its teeth when said fixed pawl is disengaged therefrom and cooperating with said abutments for different spacing movements.

2. The combination as specified in claim 1, in which said movable abutments are mounted in said rocking member.

3. The combination as specified in claim 1, in which said movable abutments are mounted in said rocking member and are normally held by springs in inoperative position, and including a universal cross-piece and movable rods adapted to be operated by said cross-pece for selectively moving said movable abutments into operative positions.

4. The combination as specified in claim 1, including a spiral spring encircling the axle of said sector-shaped loose pawl for moving the same towards said abutments.

5. The combination as specified in claim 1, including a fixed abutment, a projection on said loose pawl in a position to cooperate with said fixed abutment for the greatest spacing movement, and a second projection on said loose pawl adapted to cooperate with said movable abutments for the other spacing movements.

6. The combination as specified in claim 1, in which one cross-piece is provided for each group of types of equal width, the number of said cross-pieces being one less than the number of different distances to be covered by said loose pawl.

7. The combination as specified in claim 1, including means for disengaging the teeth of said sector-shaped loose pawl from those of said escapement wheel.

8. The combination as specified in claim 1 in which one cross-piece is provided for each group of types of equal width and including means for shifting said cross-pieces laterally.

9. The combination as specified in claim 1, including a plurality of spacing keys for operating different abutments.

10. In a typewriting machine, in combination with the movable carriage and a single escapement wheel for controlling the feed of said carriage, a rocking member, a loose pawl provided for cooperation with said escapement wheel, carried by said rocking member for engagement and disengagement with the escapement wheel and having the shape of a toothed sector, one tooth whereof is acting as the normal loose pawl, while the others act to restore the engagement with said escapement wheel on the return swing of said rocking member after disengagement in cases where the tooth acting as normal loose pawl would on the said return swing on account of its rotational spacing movement during disengagement no longer mesh with the escapement wheel, said toothed sector having a projection, and movable abutments adapted to cooperate therewith for different spacing movements.

HERMANN GÜTTLER,
Administrator for Karl Reinhold Müller, Deceased.